US008422391B2

(12) United States Patent
Zhu

(10) Patent No.: US 8,422,391 B2
(45) Date of Patent: Apr. 16, 2013

(54) METHOD, MEDIA GATEWAY AND MEDIA GATEWAY CONTROLLER FOR MAINTAINING NAT ADDRESS MAPPING TABLE

(75) Inventor: Ning Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 12/896,337

(22) Filed: Oct. 1, 2010

(65) Prior Publication Data

US 2011/0019682 A1 Jan. 27, 2011

Related U.S. Application Data

(63) Continuation of application No. PCT/CN2009/071139, filed on Apr. 2, 2009.

(30) Foreign Application Priority Data

Apr. 3, 2008 (CN) .......................... 2008 1 0103438

(51) Int. Cl.
*H04L 12/56* (2006.01)
*H04J 3/22* (2006.01)

(52) U.S. Cl.
USPC ........... 370/252; 370/401; 370/466; 709/223; 709/230

(58) Field of Classification Search .......... 370/229–232, 370/252, 253, 400, 401, 431, 464–467; 709/217, 709/218, 223–232
See application file for complete search history.

(56) References Cited

U.S. PATENT DOCUMENTS

| 7,006,436 | B1 | 2/2006 | Chu et al. | |
|---|---|---|---|---|
| 7,146,410 | B1 | 12/2006 | Akman | |
| 2003/0043740 | A1 | 3/2003 | March et al. | |
| 2003/0149789 | A1* | 8/2003 | Hoffmann | 709/245 |
| 2008/0201478 | A1* | 8/2008 | Yao et al. | 709/227 |

FOREIGN PATENT DOCUMENTS

| CN | 1571440 | | 1/2005 |
|---|---|---|---|
| CN | 1747457 | | 3/2006 |
| CN | 1852324 | A | 10/2006 |
| CN | 10168226 | A | 11/2007 |
| CN | 101552745 | | 10/2009 |
| CN | 101552803 | B | 10/2011 |
| WO | WO 02/09387 | | 1/2002 |
| WO | WO 02/103982 | | 12/2002 |

OTHER PUBLICATIONS

International Search Report for PCT/CN2009/071139, mailed Jul. 9, 2009.
Chinese Office Action mailed May 5, 2011 issued in corresponding Chinese Patent Application No. 200810103438.7.

(Continued)

*Primary Examiner* — Kerri Rose
(74) *Attorney, Agent, or Firm* — Staas & Halsey LLP

(57) ABSTRACT

A method for maintaining a Network Address Translation (NAT) address mapping table, a Media Gateway (MG) and a Media Gateway Controller (MGC) are disclosed herein. The method for maintaining the NAT address mapping table includes: the MG creates a NAT address mapping table context as instructed by a MGC, where the NAT address mapping table context stores at least one NAT address mapping entry; and the MG operates the NAT address mapping table context to maintain the NAT address mapping entry stored in the NAT address mapping table context. Through the embodiments of the present invention, the NAT address mapping table can be maintained on the MG by operating the created NAT address mapping table context.

13 Claims, 4 Drawing Sheets

OTHER PUBLICATIONS

*Updated Draft ITU-T Rec. H.248.64 (ex H.248.ipr)* "*Gateway Control Protocol: IP Router Package*" (*Ed. 0.7*), Telecommunication Standardization Sector, Study Group 16, TD 25 R1 (WP 2/16), International Telecommunication Union, Geneva, Jan. 27-Feb. 6, 2009, pp. 1-48.

Written Opinion of the International Searching Authority, mailed Jul. 9, 2009, in corresponding International Application No. PCT/CN2009/071139 (4 pp.).

Extended European Search Report, mailed Mar. 23, 2011, in corresponding European Application No. 09726984.9 (8 pp.).

* cited by examiner

METHOD, MEDIA GATEWAY AND MEDIA GATEWAY CONTROLLER FOR MAINTAINING NAT ADDRESS MAPPING TABLE

CROSS-REFERENCE TO RELATED APPLICATIONS

This application is a continuation of International Application No. PCT/CN2009/071139, filed on Apr. 2, 2009, which claims priority to Chinese Patent Application No. 200810103438.7, filed on Apr. 3, 2008, both of which are hereby incorporated by reference in their entireties.

TECHNICAL FIELD

The present invention relates to the communication field, and in particular, to a method, Media Gateway (MG), and Media Gateway Controller (MGC) for maintaining Network Address Translation (NAT) address mapping table.

BACKGROUND

With rapid development of computer and communication technologies, using a public packet-based network to bear voice, data, images and other various services becomes a direction of the network development. The trend of service development and network convergence gives rise to Next Generation Network (NGN), which is centered on soft-switch device. The NGN works in a packet-based network, and uses a distributed network architecture. It bears voice, video and multimedia services effectively, and achieves separation of the service application, service control, and service transmission. An NGN in the prior art includes a Media Gateway (MG) and a Media Gateway Controller (MGC). The MGC is configured to manage call state and control bearer resources of the MG. The MG is configured to convert the format of media flows. For example, the MG converts the media information in the E1 timeslot in a Circuit Switched (CS) network into Realtime Transport Protocol (RTP) media flows of an Internet Protocol (IP) network. Moreover, the MG creates, modifies, and releases media flows, and manages resources under signaling controlling of the MGC.

The popularization of the NGN increases the demand for IP addresses massively. Currently, two solutions to coping with deficiency of IP addresses are: deploying IPv6 addresses uniformly, and applying the NAT traversal technology. The IPv6 brings revolutionary transformation to the existing network. Deployment IPv6 addresses is a focus in the next stage of implementing the NGN. Therefore, for the current stage of deploying the NGN, importance should be attached to the NAT traversal technology.

The MG implements NAT functions. When the MG is located between a private network and a public network, address mapping is generated on the MG when the MG receives an IP packet sent by the private network to the public network.

In the process of developing the present invention, the inventor finds at least the following problems in the prior art:

In the prior art, the NAT address mapping table tends to be oversized, for example, includes 100,000 NAT address mapping entries. Therefore, the maintenance of the NAT address mapping is essential. However, in the prior art, the MGC and the MG are unable to operate the NAT address mapping table.

SUMMARY

The aspects of the present invention provide a method, MG, and MGC for maintaining NAT address mapping table, so that the NAT address mapping table can be maintained on the MG.

A method for maintaining a NAT address mapping table on an MG is provided in an aspect of the present invention. The method includes:

creating, by a Media Gateway (MG), a NAT address mapping table context as instructed by a Media Gateway Controller (MGC), wherein the NAT address mapping table context stores at least one NAT address mapping entry; and operating, by the MG, the NAT address mapping table context to maintain the NAT address mapping entry stored in the NAT address mapping table context.

An MG provided in an aspect of the present invention includes:

a creating module, configured to create a Network Address Translation (NAT) address mapping table context as instructed by a Media Gateway Controller (MGC), wherein the NAT address mapping table context stores at least one NAT address mapping entry; and a maintaining module, configured to operate the NAT address mapping table context as instructed by the MGC.

An MGC provided in an aspect of the present invention includes:

an instructing module, configured to instruct a Media Gateway (MG) to execute one of: creating a Network Address Translation (NAT) address mapping table context, modifying and deleting a created NAT address mapping table context.

Compared with the prior art, the aspects of the present invention create a NAT address mapping table context, the NAT address mapping table context stores at least one NAT address mapping entry. Therefore, the MG can operate the NAT address mapping table context to maintain one or more NAT address mapping entries, and the MG can maintain the NAT address mapping table.

DETAILED DESCRIPTION OF THE EMBODIMENTS

In order to make the embodiments of present invention clearer, the following describes the NAT technology first. NAT is a technology for mapping one address field (such as Intranet address field) to another address field (such as Internet address field). The NAT is a standard of the Internet. It is located at the boundary between the private network and the public network. When an IP packet sent by the private network arrives at the NAT device, the NAT device is responsible for converting the private network IP address into the legal IP address of the public network, namely, mapping the Intranet IP address to the legitimate IP address of the public network, thus generating a NAT address mapping record. The NAT address mapping table on the NAT aggregates the NAT address mapping records on the NAT device; and the NAT address mapping table is an address translation table. Every NAT address mapping record is a NAT address mapping table entry. When a packet sent from the outside arrives at the NAT device, the NAT device queries information in the NAT address mapping table stored in the NAT device, and converts the public network address into a private network address and forwards it to an internal receiving point. In the case of basic NAT, the NAT address mapping table stores the IP address mapping relations between the Intranet and the Internet. In the case of Network Address Port Translation (NAPT), the NAT address mapping table stores the mapping relations between the IP address plus port of the Intranet and the IP address plus port of the Internet. In the RFC3022, basic NAT and NAPT are collectively called traditional NAT.

NAT comes in four types: Full Cone, Restricted Cone, Port Restricted Cone, and Symmetric. The first three types are collectively called cone NAT, and share one common feature: For every packet sent from the same Internal IP address and port, the NAT converts the address and port into the same external IP address and port. The Symmetric type is a little different: For every packet sent from the same internal IP address and port and sent to the same external destination IP address and port, the NAT converts the internal IP address and port into the same external IP address and port; for every packet sent from the same internal IP address and port but sent to a different external destination IP address and port, the NAT uses a different mapping relation, and converts the internal IP address and port into a different external IP address and port.

The embodiments of the present invention support the foregoing NAT technology.

Figure 1:
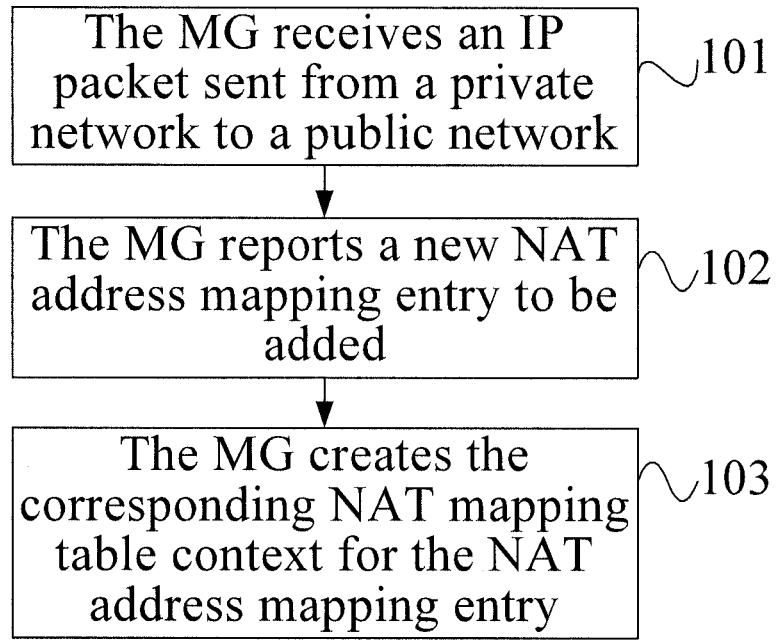
FIG. 1 is a flowchart of a method for maintaining a NAT address mapping table on an MG in the first embodiment of the present invention.

FIG. 1 is a flowchart of a method for maintaining a NAT address mapping table in the first embodiment of the present invention. The method in this embodiment includes the following steps:

Step 101: The MG receives an IP packet sent from a private network to a public network.

If a NAT address mapping entry available to this IP packet already exists on the MG, the existing NAT address mapping entry may be applied directly, and the public network address in this address mapping entry replaces the source private network address of the IP packet, and then IP packet is sent from the egress interface to the external network, and the process is ended. Otherwise, the MG generates a new NAT address mapping entry for the IP packet, and proceeds to step 102.

The public network address mentioned in this embodiment refers to public network IP address and port; the private network address mentioned in this embodiment refers to private network IP address and port.

The IP packet forwarded by the MG between the private network and the public network generally refers to the IP packet of media flows. If a signaling also needs to pass through the MG in this way, the method under the embodiments of present invention is also applicable to processing IP packets of signaling messages. The NAT is generally applied between a public network and a private network to convert Transfer Control Protocol (TCP) or User Datagram Protocol (UDP) IP address and the transport-layer port. As transport layer protocols, the TCP and the UDP encapsulate IP protocol (network-layer protocol).

Step 102: The MG reports a new NAT address mapping entry to be added.

The new H.248 NAT MapAdd event is reported when the MG receives an IP packet sent from the private network to the public network and generates a new NAT address mapping entry. This event may be set on the root termination, or set on other terminations, for example, set on a termination that represents the interface; this event may add a filtering condition to the source private network address and/or destination address of the IP packet, for example, specify an address or address range. This event carries the parameter "NatMapEntry" when the event is reported, and the data type is "string list". This parameter describes one or more NAT address mapping entries which are newly generated. In order to reduce the H.248 protocol messages, multiple NAT address mapping entries generated by multiple IP packets may be carried in a "NatMapEntry" parameter in one event in the process of reporting. Each row in the foregoing string list represents a newly generated NAT address mapping entry. The format is as follows:

PrivateIPAddress "|" PrivatePort "|" PrivateInerfaceID "|" DestinationIPAddress "|" DestinationPort "|" PublicIPAddress "|" PublicPort "|" PublicInerfaceID.

In the format above, PrivateIPAddress is a private network IP address of the NAT address mapping entry; PrivatePort is a private network port of the NAT address mapping entry; PrivateInerfaceID is a private network interface ID of the NAT address mapping entry; DestinationIPAddress is a destination IP address of the IP packet that generates the NAT address mapping entry; DestinationPort is a destination IP port of the IP packet that generates the NAT address mapping entry; PublicIPAddress is a public network IP address of the NAT address mapping entry; PublicPort is a public network port of the NAT address mapping entry; and PublicInerfaceID is a public network interface ID of the NAT address mapping entry.

The string of the format above is only a practicable definition method. In practice, the string format may be adjusted. Some contents are optional. For example, if the event is set on a termination representative of a public network interface, it is not necessary to report the PublicInerfaceID; if basic NAT is applied instead of NAPT, it is not necessary to report PrivatePort or DestinationPort, but the basic principles are the same.

For the NAT of the Symmetric type, the same private network address is mapped to different public network addresses in the case that the destination address is different. Therefore, DestinationIPAddress and DestinationPort need to be reported. Additionally, the reporting of the DestinationIPAddress and the DestinationPort may be intended for other purposes. For example: In the signaling negotiation process, the MGC can call the media IP address and port of the peer, and the IP address and port is the destination IP address and port of the media flow which is sent from one side of the call and passes the MG. Therefore, the MGC can use DestinationIPAddress and DestinationPort as a basis for judging the call to which the NAT address mapping is applied.

Step 103: The MGC instructs the MG to create the corresponding NAT address mapping table context (NATMap context) for the NAT address mapping entry.

After receiving this event, the MGC sends to the MG an indication of creating a NATMap context for the reported NAT address mapping entry with respect to this event. The context creation in the H.248 protocol is implemented by adding the termination to a new context on the MG.

A new context attribute "NATMap" of the H.248 protocol is added, its data type is BOOL, and its value may be "Yes" or "No", and is "No" by default. When this attribute value is "Yes", it indicates that the context is a NAT address mapping table context or abbreviated as NATMap context. When this attribute value is "No", it indicates that the context is not NAT address mapping table context. Alternatively, by virtue of the H.248 attribute, for example, the IP routing package of the draft H.248 standard provides an attribute descriptive of the context type, for example, back-to-back type or IP route type. A type enumerative value is added in this attribute to represent the NATMap type.

On the MG, the interfaces may be grouped. The interfaces between which packets are forwarded may be put into the same group. No packet forwarding relation exists between interfaces of different groups. Every interface in the same group is represented by an H.248 termination. The interface terminations of the same group are put in the same context. The context of this type is hereinafter referred to as interface context.

Two terminations are created in the NATMap context, and the two terminations represent the internal network interface and the external network interface of the IP packet that uses the NAT address mapping entry respectively. The internal network interface is generally an interface connected to the internal private network side; and the external network interface is generally an interface connected to the external public network. A NATMap context represents one or more NAT address mapping entries in the NAT address mapping table. For example, a NATMap context "C1" is created. In C1, the termination that represents the internal network interface is T1, and the termination that represents the external network interface is T2. An attribute, event, or statistic may be set on T1 and T2. The traffic may be measured on T2, and the MGC can obtain the traffic information of the IP packet that uses the NAT address mapping entry. A NAT address mapping entry is generally applicable to a specific call only. Therefore, the operation on the address mapping level is generally an operation on the call level.

The NATMap context represents an abstract NAT address mapping. The IP flow, which flows through the MG, flows through the termination in the interface context. The main purpose of the NATMap context is to store the NAT address mapping table entry. Two terminations in the context are abstract concepts. It is possible that only one termination is created in a NATMap context. The filtering, event, and statistic set for the IP flow that uses the stored NAT address mapping may be sent to this termination.

After the interface termination in the interface context receives the IP packet, if the destination address is not the local address of this interface, the interface termination searches the routing table to obtain the egress interface. If NAT is required, the NATMap context is searched to obtain the NAT address mapping entry; in order to improve the search efficiency, the interface context may be correlated with the NATMap context. An example of the correlation is: The NATMap context carries the context attribute, and its value is the ContextID of the relevant interface context.

The following H.248 protocol extension is performed for the NATMap context:

A new context attribute "NATType" of the H.248 protocol is added, its data type is enumerative variable, and its value may be "FullCone", "RestrictedCone", "PortRestricted-Cone", "Symmetric", or "NULL", and is "NULL" by default. The first four values represent four NAT types respectively. "NULL" indicates that the context does not support the NAT function. If the NATType value is not "NULL", the rules of the context using the NAT address mapping entry are defined in RFC3489. For example, if the IP packet of the external network is received, and the destination IP address and the destination port of the IP packet comply with the address mapping of a NATMap context whose NATType value is Symmetric, it is necessary to check the source IP address and the source port of the IP packet are the source IP address and the source port of the device in the public network that generates this address mapping.

A new context attribute "NATNAPT" (NAT network address port translation) of the H.248 protocol is added, its data type is enumerative variable, and its value may be "BasicNAT", "NAPT", or "NULL", indicating implementation of the basic NAT function, implementation of the NAPT function, and no implementation of the NAT function respectively, and the valued is "NULL" by default.

A new context attribute "NATMapItem" (NAT mapping entry) of the H.248 protocol is added. This attribute is used for storing the NAT address mapping entry. Through setting and modification of this attribute value, the MGC or MG may operate and maintain the NAT address mapping entry. Its data type is a string. This string stores one entry of the NAT address mapping table. A practicable method of defining the format is as follows:

If the value of NATType is "FullCone", "RestrictedCone", or "PortRestrictedCone", the format of this string is:

PrivateIPAddress "|" PrivatePort "|" PublicIPAddress "|" PublicPort.

If the value of NATType is "Symmetric", the format of this string is:

PrivateIPAddress "|" PrivatePort "|" DestinationIPAddress "|" DestinationPort "|" PublicIPAddress "|" PublicPort.

If the value of NATType is "NULL", this string is null.

If the value of NATNAPT is "BasicNAT", the port does not need to be considered, and only the mapping between the IP addresses is considered. Therefore, the foregoing string does not need to carry PrivatePort or PublicPort; or the PrivatePort and the PublicPort are null.

As a NATMap context, the NATMapItem attribute carries no NAT address mapping entry, which makes no sense. When this circumstance occurs, the MGC may delete the NATMap context by deleting all terminations in the NATMap context. From the perspective of the protocol, the protocol is not violated if this context is not deleted.

Besides, the context attribute "NATMapItem" may be optimized in the following way so that one NATMap context can be used for maintaining multiple address mapping entries. The optimization method is to define the NATMapItem attribute as a string list, and each row in the list describes a NAT address mapping entry. Multiple NAT address mapping entries described in this list have the same internal network interface and external network interface. If one NATMap context can be used for maintaining multiple address mappings, after the MG reports a new NAT address mapping entry, the MG does not need to create a new NATMap context, but modifies the NATMapItem attribute of the existing NATMap context to accomplish the purpose. For example, one row is added in the string list to describe the new NAT address mapping entry. In the embodiments of present invention, modifying a context attribute is an operation of modifying the context. The operation for the context attribute may carry commands or not.

In step 101 of this embodiment, by searching for the NAT address mapping stored in the NATMap context, the MG may judge whether a NAT address mapping entry available to the IP packet exists on the MG. A special circumstance is: After the MG reports a new NAT address mapping entry, before the MGC adds the NAT address mapping entry by creating or modifying the NATMap context, the MG receives a new IP packet that needs to use this NAT address mapping entry. A practicable mode is: The MG continues using the previously created NAT address mapping entry. If the MGC does not set the NATMapItem attribute of the NATMap context by operating (adding or modifying) the NATMap context in order to reflect this NAT address mapping entry within the specified period, the MG reports the event repeatedly to implement synchronization of the NAT address mapping table between the MGC and the MG. Another practicable method is: The MG waits until the MGC sets the NATMapItem attribute of the NATMap context by operating (adding or modifying) the NATMap context in order to reflect this NAT address mapping entry.

When the IP routing and the NAT function are implemented on an MG, its physical interfaces or logical interfaces may be grouped. The groups are independent of each other, and no IP packet is forwarded between the groups. A relatively independent group of interfaces is placed in a separate interface context and has an independent contextID. In this embodiment, new context attributes are added to correlate the NATMap context with such interface groups. For example, a context attribute is extended so that it carries the contextID of the interface context described above. The default value of this attribute is 0, indicating that the interface group is not correlated with any interface context. The purpose of the foregoing practice is: The MG can find the relevant NATMap context through the interface context after receiving the bearer-layer IP packet, and then search for the available NAT address mapping entry.

In this embodiment, the MGC may instruct the MG to create a NATMap context for an entry in the NAT address mapping table, thus maintaining the NAT address mapping table. In this embodiment, the MG generates a NAT address mapping entry after receiving the IP packet, and reports the entry to the MGC; and the MGC stores the address mapping as a context attribute into the NATMap context. This embodiment may be adjusted in the following way: In step 102, the message reported by the MG carries no address mapping result (the IP address and port of the mapped public network), but the MGC instructs the MG to create a NATMap context in step 103, and the MG sends a response message that carries the address mapping result to the MGC.

The context attributes "NATMap" and "NATMapItem" mentioned above may be defined as attributes on the termination of the NATMap context, and the operations for the context attribute described herein may also be implemented by operating the termination attribute, in which case the principles and definitions are the same as context attribute.

The NAT address mapping entry has a keepalive mechanism. If the NAT address mapping entry is not put into use in the specified period, the NAT address mapping entry fails, and resources are released to the new NAT address mapping entry. When the keepalive timer expires, the MG needs to report the expiry in order to operate the corresponding NATMap context.

Figure 2:
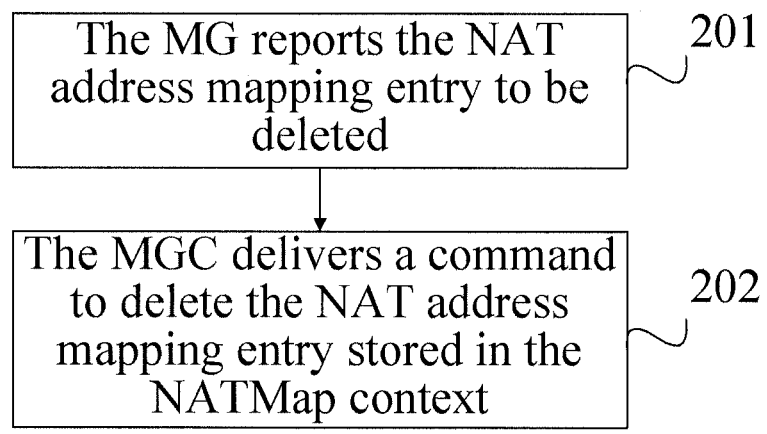
FIG. 2 is a flowchart of a method for maintaining a NAT address mapping table on an MG in the second embodiment of the present invention.

FIG. 2 is a flowchart of a method for maintaining a NAT address mapping table on an MG in the second embodiment of the present invention.

Step 201: The MG reports a NAT address mapping entry to be deleted.

A new H.248 NatMapDelete event is added. This event is reported when the NAT address mapping entry on the MG needs to be deleted for reasons such as timeout. This event may be set on an egress termination of the NATMap context, for example, set on the external network interface T2 described above; this event may be reported on the root termination or another termination representative of the interface; when being reported, this event carries the contextID of the NATMap context or the NAT address mapping entry to be deleted, and therefore, the MGC can locate the NATMap context of the NAT address mapping entry to be deleted.

In practice, a NatMapDelete event may carry a NAT address mapping entry to be deleted, or a NatMapDelete event carries one or more NAT address mapping entries to be deleted. The implementation mode is similar to that of the string list of the context attribute "NATMapItem".

Step 202: The MGC delivers a command to delete the NAT address mapping entry stored in the NATMap context.

After the MGC receives the NatMapDelete event, if the H.248 context attribute "NATMapItem" of the NATMap context that includes the NAT address mapping entry stores only this NAT address mapping entry, the MGC may deliver an H.248 Subtract command to the MG as an instruction of deleting all terminations in the NATMap context. In this way, the NATMap context is deleted. If the NATMap context is not deleted, the NAT address mapping entry in its context attribute "NATMapItem" may be deleted instead; but it is recommended to delete the NATMap context. If the H.248 context attribute "NATMapItem" of the NATMap context that includes the NAT address mapping entry stores the NAT address mapping entry in addition to the NAT address mapping entry to be deleted, it is necessary only to modify the context attribute "NATMapItem" and remove the NAT address mapping entry that needs to be deleted.

In some circumstances, the MGC needs to delete the NAT address mapping entry actively. For example, the MGC determines that a NAT address mapping entry will not be put into use any longer, the MGC does not need to wait for expiry of the keepalive timer on the MG before reporting the NatMapDelete event, but sends a Subtract command actively to instruct the MG to delete the NATMap context, or instruct the MG to delete the relevant NAT address mapping entry by modifying the NATMapItem attribute of the NATMap context.

Likewise, by modifying the NATMap context attribute actively, the MGC can modify the NAT address mapping entry carried in the NATMap context.

In the first embodiment of the method for maintaining the NAT address mapping table on the MG, the NAT address mapping entry is allocated by the MG dynamically after the MG receives the IP packet (such as media flows) sent from the private network to the public network, namely, the MG generates the address mapping only if an IP packet passes through the MG. In the first embodiment of the method for maintaining the NAT address mapping table on the MG, when media capabilities are negotiated on the signaling layer, the media private network address "Pr1A1" (including IP address and port, the same being applicable hereinafter) on the private network side is applied to negotiation. The media IP packet sent from the public network to the private network cannot reach the destination; the termination on the private network side sends an IP packet to the peer located in the public network to trigger the MG to generate a NAT address mapping entry, and then the PriA1 address is mapped to the public network address "PubA1", whereupon the peer on the public network side can obtain the public network address "PubA1" through signaling messages.

Figure 3:
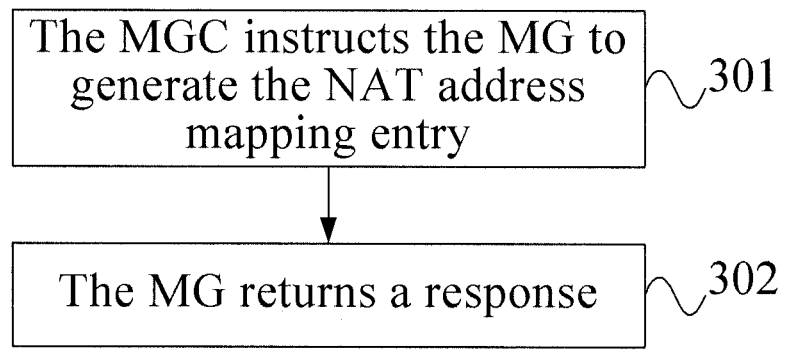
FIG. 3 is a flowchart of a method for maintaining a NAT address mapping table on an MG in the third embodiment of the present invention.

FIG. 3 is a flowchart of a method for maintaining a NAT address mapping table on an MG in the third embodiment of the present invention. The method in this embodiment includes the following steps:

Step 301: The MGC instructs the MG to generate a NAT address mapping entry.

In this embodiment, in the process of negotiating media capabilities, the MGC can instruct the MG to generate the NAT address mapping entry beforehand without using the media IP packet. For example, after obtaining the media private network address "Pr1A1" on the private network side in the signaling negotiation process, the MGC does not use it for media capability negotiation on the signaling layer, but instructs the MG to map this private network address to the NAT mapping address, and then applies the public network address after the NAT address mapping to the subsequent media capability negotiation. The media IP packet may use the generated NAT address mapping entry for interaction. Through this method, the media flows can be connected in both directions without existence of the IP packet sent from the private network to the public network. Besides, this method is applicable even if both parties to the call are located in different private networks.

Specifically, the MGC may instruct the MG to generate the NAT address mapping entry in the following two methods:

Method 1: The MGC instructs the MG to create or modify the NATMap context, and sets the NAT address mapping entry to the MG directly. That is, the mapped public network address is not allocated by the MG, but is specified by the MGC. The MGC can accomplish that purpose by setting the context attribute "NATMapItem".

Method 2: The MGC instructs the MG to create or modify the NATMap context, and instructs the MG to allocate a NAT address mapping entry.

The syntax of the string in the context attribute "NATMapItem" is extended, and PublicIPAddress and PublicPort may be wildcards. For example, in the message delivered by the MGC, if the context attribute "NATMapItem" is set to "10.11.1.100|10000|202.1.100.1|20000", it indicates that the set NAT address mapping entry is: mapping the private network address 10.11.1.100:10000 to the public network address 202.1.100.1:20000; if the context attribute "NATMapItem" in the message delivered by the MGC is set to "10.11.1.100|10000|$|$", it indicates that the MGC requires the MG to map the private network address 10.11.1.100:10000 to a public network address.

It should be noted that if multiple NAT address mapping entries can be described by the context attribute "NATMapItem", the two methods above do not need to create a new NATMap context, but modify the existing NATMap context instead.

Alternatively, a new context attribute or a new termination attribute is defined to implement such functions.

In some circumstances, multiple NAT address mapping entries may be interrelated. For example, the RTP port number is necessarily an even number, and the corresponding RTCP port is an odd-number port next to the RTP port. When the NAT maps the public network address for the RTP and the RTCP respectively, the public network IP address and the port after mapping do not necessarily meet requirements. Therefore, the H.248 protocol needs to be extended, and different NAT address mapping entries are correlated with each other. One of the practicable correlation methods is as follows:

The context attribute "EvenPort" of the H.248 protocol is extended, and its data type is a BOOL variable. If the attribute value is "YES", the MG allocates an even-number port when allocating the public network address of the NAT address mapping entry. If the attribute value is "NO", the port allocation performed by the MG is not restricted to the foregoing rule. The default attribute value is "NO".

The context attribute "SuccPort" of the H.248 protocol is extended, and its data type is a BOOL variable. If the attribute value is "YES", the MG allocates a public network address to the NAT address mapping entry, the allocated IP address is the same as the IP address after the NAT address mapping entry carried in the previous context of the H.248 protocol message, and the port number is the next port number. If the attribute value is "NO", the allocation of the IP address and port is not restricted to the foregoing rule. The default attribute value is "NO".

Through the two extended context attributes above, the MG allocates an even port to the IP flow for RTP, and allocates the odd port immediately after the allocated even port to the RTCP flow.

Step 302: The MG makes a response.

If the MGC specifies the public network address after the NAT address mapping entry forcibly in step 301 according to method 1, the response message sent by the MG in this step carries information indicating success or failure. If the after-mapping public network address specified by the MGC is not available for allocation, the MG returns an error code.

If the MGC instructs the MG to allocate the public network address after the NAT address mapping entry in step 301 according to method 2, the MG allocates the public network address and port after the NAT address mapping entry in this step, and the response message carries a context attribute "NATMapItem" which carries the public network address and port to the MGC. If the context attribute "EvenPort" in the request message carries a condition, the MG needs to allocate the public network address after the NAT address mapping entry according to this condition. If the allocation fails, an error code is returned.

In step 301, the MG may send a response message that carries the NAT address mapping result to the MGC. An alternative method is: The MG uses a subsequent event instead of the response message to report the NAT address mapping result.

Figure 4:
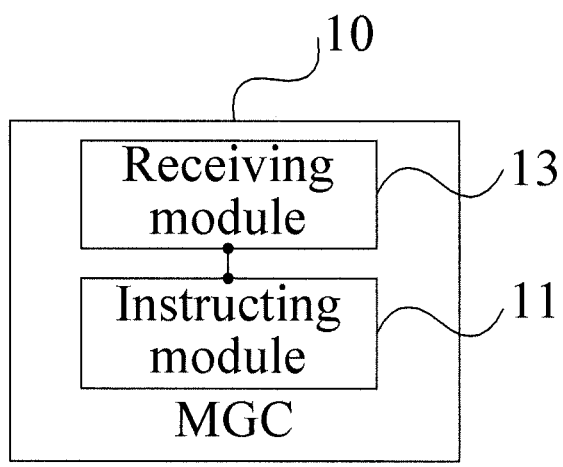
FIG. 4 shows a structure of an MGC in an embodiment of the present invention.

FIG. 4 shows a structure of an MGC 10 in an embodiment of the present invention. The MGC 10 includes: a receiving module 13 and an instructing module 11, which are connected with each other. The receiving module 13 is adapted to receive an event of at least one of adding, modifying, and deleting the NAT mapping entry. The instructing module 11 is adapted to instruct an MG to create a NAT address mapping table context or modify or delete a created NAT address mapping table context in light of the event received by the receiving module 13.

In this embodiment, the instructing module 11 may instruct the MG to create a NAT address mapping table context for the entry in the NAT address mapping table, or modify or delete the created NAT address mapping table context. The operations are performed in two modes. The first operation mode is: The MGC instructs the MG to operate the NAT address mapping table context after the MG reports change of the NAT address mapping entry. That is, when the MG deletes the NAT address mapping entry for reasons such as timeout, or generates a new NAT address mapping entry because an IP packet sent from the private network to the public network is received, the MG reports the corresponding event to the receiving module 13, and the instructing module 11 instructs the MG to delete or create the corresponding NAT address mapping table context. The other operation mode is: The instructing module of the MGC instructs the MG to modify the NAT address mapping entry without waiting for report from the MG.

Figure 5:
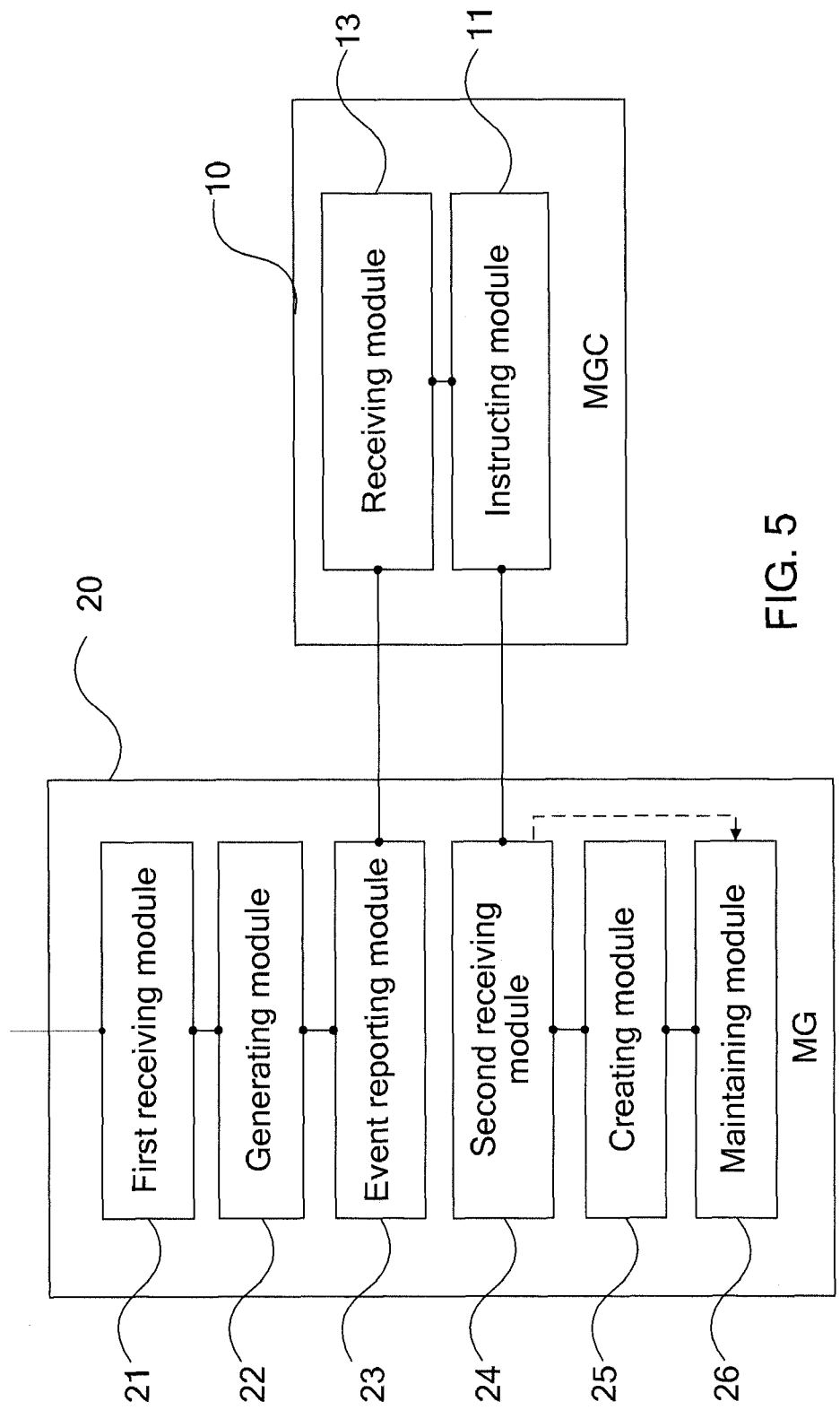
FIG. 5 shows a structure of an MG in an embodiment of the present invention.

FIG. 5 shows a structure of an MG 20 in an embodiment of the present invention. The MG 20 includes: a first receiving module 21 and a generating module 22, which are connected with each other. The first receiving module 21 is adapted to receive a NAT address mapping table generating message that carries a private network address; and the generating module 22 is adapted to generate a NAT address mapping entry according to the private network address carried in the generating message.

The MG in this embodiment further includes an event reporting module 23, which is adapted to report an event of at least of adding, modifying, and deleting related to the address mapping entry to the MGC. Examples of the event are:

NAT MapAdd event: This event is reported when the MG receives an IP packet sent from the private network to the public network and generates a new NAT address mapping entry; or NatMapDelete event: This event is reported when the NAT address mapping entry on the MG needs to be deleted for reasons such as timeout.

The MG in this embodiment further includes a second receiving module 24 and a creating module 25. The second receiving module 24 is adapted to receive an instruction from the MGC 10 and sends the instruction to the creating module 25 or maintaining module 26. The creating module 25 is adapted to create the corresponding NATMap context if the instruction received by the second receiving module 24 is an instruction of creating a NATMap context, where the NATMap context stores one or more NAT address mapping entries.

The MG in this embodiment further include a maintaining module 26, which is adapted to operate the corresponding NATMap context if the instruction received by the second receiving module 24 is an instruction of operating the NATMap context, where the operation includes deletion of the NAT address mapping entry stored in the corresponding NATMap context.

In this embodiment, before media capability negotiation, the MGC can use the receiving module of the MG to instruct the generating module of the MG to generate a NAT address mapping entry beforehand, and therefore, the MG can use the after-mapping address directly in the media negotiation, and the media flow can reach the peer in both directions.

Further, the MG in this embodiment may further include an event reporting module 23, which is adapted to report an event of at least one of adding, modifying, and deleting a NAT mapping.

Figure 6:
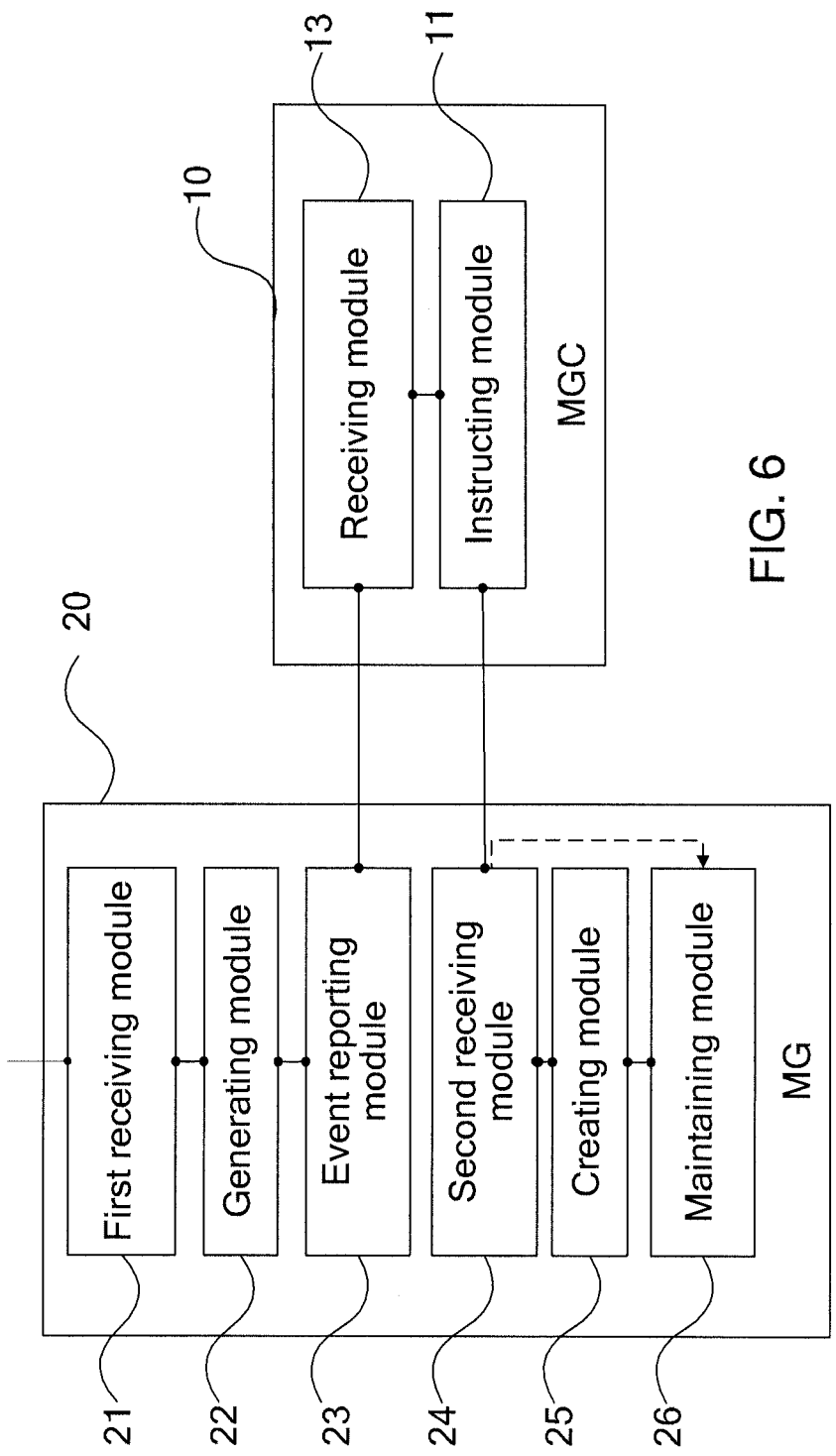
FIG. 6 shows a structure of a system for maintaining a NAT address mapping table on an MG in an embodiment of the present invention.

FIG. 6 shows a structure of a system for maintaining a NAT address mapping table on an MG in an embodiment of the present invention. The system in this embodiment includes an MG 20 and an MGC 10, which are the MG and the MGC described in the foregoing two embodiments. The MG 20 is adapted to: generate a NAT address mapping entry, report an event related to the NAT address mapping entry to the MG, generate a NATMap context as instructed by the MGC, and perform a corresponding operation; and the MGC 10 is adapted to: instruct the MG to create a NAT address mapping table context that stores one or more NAT address mapping entries, and instruct the MG to operate the NAT address mapping table context.

The MG 20 may include a first receiving module 21, a generating module 22, an event reporting module 23, a second receiving module 24, a creating module 25, and a maintaining module 26, which are connected with each other.

The first receiving module 21 is adapted to receive a NAT address mapping table generating message that carries a private network address.

The generating module 22 is adapted to generate a NAT address mapping table according to the private network address carried in the generating message.

The event reporting module 23 is adapted to report an event of at least one of adding, modifying, and deleting the NAT mapping entry.

The second receiving module 24 is adapted to receive an instruction from the MGC.

The creating module 25 is adapted to create the corresponding NATMap context if the instruction received by the second receiving module 24 is an instruction of creating a NATMap context.

The maintaining module 26 is adapted to operate the corresponding NATMap context if the instruction received by the second receiving module 24 is an instruction of operating the NATMap context.

The MGC 10 includes:

a receiving module 13, adapted to: receive an event of at least one of adding, modifying, and deleting the NAT mapping entry, and send the event to an instructing module 11 as a trigger for the instructing module 11 to deliver an instruction in light of the event received by the receiving module 13; and an instructing module 11, adapted to instruct an MG 20 to create a NAT address mapping table context or modify or delete a created NAT address mapping table context.

In this embodiment, the created NATMap context is operated, namely, the NAT address mapping table is operated through the NATMap context, and therefore, the NAT address mapping table can be maintained on the MG. Besides, a NATMap context represents a NAT address mapping entry. Through the NATMap context and the terminations in it, the level of the NAT address mapping entry can be measured, and the attribute and the event can be set. The MG reports change of the NAT address mapping table entry through an event, the MGC operates the NATMap context to maintain the NAT address mapping table, and a correct NAT address mapping table is generated according to all NAT address mapping entries stored in the NATMap context.

After reading the foregoing embodiments, those skilled in the art are clearly aware that the present invention may be implemented through hardware, or through software in addition to a necessary universal hardware platform. The technical solution under the present invention may be embodied as a software product. The software product may be stored in a non-volatile storage medium (such as CD-ROM, USB flash disk, or mobile hard disk), and may incorporate several instructions that enable a computer device (such as personal computer, server, or network device) to perform the method specified in any embodiment of the present invention.

The above descriptions are merely preferred embodiments of the present invention, but are not intended to limit the scope of the present invention. Any modification, equivalent replacement, or improvement made without departing from the spirit and principles of the present invention shall fall within the scope of the present invention.

What is claimed is:

1. A method for maintaining a Network Address Translation (NAT) address mapping table, comprising:
   creating, by a Media Gateway (MG), a NAT address mapping table context as instructed by a Media Gateway Controller (MGC), wherein the NAT address mapping table context stores at least one NAT address mapping entry; and
   operating, by the MG, the NAT address mapping table context to maintain the NAT address mapping entry stored in the NAT address mapping table context, wherein the NAT address context attribute and an attribute of a termination in the context to store the NAT address mapping entry.

2. The method according to claim 1, comprising:
allocating, by the MG, the NAT address mapping entry to an Internet Protocol (IP) packet when the IP packet sent from a private network to a public network is received.

3. The method according to claim 2, further comprising:
reporting, by the MG, the NAT address mapping entry to the MGC; and
receiving, by the MG, an instruction of creating the NAT address mapping table context for the reported NAT address mapping entry from the MGC.

4. The method according to claim 1, further comprising:
receiving, one instruction of: adding, modifying, and deleting a NAT mapping from the MGC; wherein
the operating of the NAT address mapping table context comprise one of: creating, modifying and deleting the NAT address mapping table context according to the instruction of the MGC.

5. The method according to claim 4, wherein, before receiving one instruction of: adding, modifying, and deleting the NAT mapping from the MGC, the method further comprises:
reporting, one event of: adding, modifying, and deleting the NAT mapping to the MGC.

6. The method according to claim 1, wherein:
the MGC sets the NAT address mapping entry and sends the NAT address mapping entry to the MG directly.

7. The method according to claim 1, wherein:
the MGC instructs the MG to allocate the NAT address mapping entry.

8. The method according to claim 1, further comprising:
grouping, by the MG, interfaces according to the instruction of the MGC, creating an interface context, and
correlating, by the MG, the interface context with the NAT address mapping table context.

9. The method according to claim 8, further comprising:
searching, by the MG, for the NAT address mapping table context to be operated according to the interface context as well as correlation between the interface context and the NAT address mapping table context.

10. A Media Gateway (MG), comprising:
a creating module, configured to create a Network Address Translation (NAT) address mapping table context as instructed by a Media Gateway Controller (MGC), wherein the NAT address mapping table context uses one of a context attribute and an attribute of a termination in the context to store a NAT address mapping entry, the NAT address mapping table context comprises two created terminations, and the two created terminations represent an internal network interface and an external network interface of an IP packet that uses the NAT address mapping entry respectively, the internal network interface is connected to an internal private network, the external network interface is connected to an external public network; and
a maintaining module, configured to operate the NAT address mapping table context created by the creating module as instructed by the MGC.

11. The MG according to claim 10, further comprises:
a reporting module, configured to report at least one event of: adding, modifying, and deleting a NAT mapping to the MGC; and
a second receiving module, configured to receive an instruction of adding, modifying, or deleting the NAT address mapping table context, wherein the instruction is sent by the MGC according to the event reported by the reporting module; and send the instruction to the maintaining module.

12. A Media Gateway Controller (MGC), comprising:
an instructing module, configured to instruct a Media Gateway (MG) to execute one of creating a Network Address Translation (NAT) address mapping table context, modifying and deleting a created NAT address mapping table context, wherein the NAT address mapping table context uses one of a context attribute and an attribute of a termination in the context to store a NAT address mapping entry, the NAT address mapping table context comprises two created terminations, and the two created terminations represent an internal network interface and an external network interface of an IP packet that uses the NAT address mapping entry respectively, the internal network interface is connected to an internal private network, the external network interface is connected to an external public network.

13. The MGC according to claim 12, further comprising:
a receiving module, configured to receive at least one event of: adding, modifying, and deleting the NAT mapping entry, and send the event to the instructing module as a trigger for the instructing module to deliver an instruction in light of the event received by the receiving module.

* * * * *

UNITED STATES PATENT AND TRADEMARK OFFICE
CERTIFICATE OF CORRECTION

PATENT NO. : 8,422,391 B2  
APPLICATION NO. : 12/896337  
DATED : April 16, 2013  
INVENTOR(S) : Ning Zhu Page 1 of 1

It is certified that error appears in the above-identified patent and that said Letters Patent is hereby corrected as shown below:

In the Claims

Column 13, Line 1, In Claim 1, after "NAT address" insert -- mapping table context uses one of a --, therefor.

Signed and Sealed this
Twenty-fourth Day of March, 2015

Michelle K. Lee
*Director of the United States Patent and Trademark Office*